(12) United States Patent
Chen

(10) Patent No.: US 11,383,255 B2
(45) Date of Patent: Jul. 12, 2022

(54) GUIDING PIPE FOR WATER SPRAYER

(71) Applicant: SHIN TAI SPURT WATER OF THE GARDEN TOOLS CO., LTD, Chang-Hua Hsien (TW)

(72) Inventor: Chin-Yuan Chen, Chang-Hua Hsien (TW)

(73) Assignee: SHIN TAI SPURT WATER OF THE GARDEN TOOLS CO., LTD, Chang-Hua Hsien (TW)

(*) Notice: Subject to any disclaimer, the term of this patent is extended or adjusted under 35 U.S.C. 154(b) by 107 days.

(21) Appl. No.: 16/924,016

(22) Filed: Jul. 8, 2020

(65) Prior Publication Data
US 2022/0008942 A1   Jan. 13, 2022

(51) Int. Cl.
*B05B 9/01* (2006.01)
*B05B 1/34* (2006.01)
*F16L 9/00* (2006.01)

(52) U.S. Cl.
CPC .............. *B05B 9/01* (2013.01); *B05B 1/34* (2013.01); *B05B 1/341* (2013.01); *B05B 1/3405* (2013.01); *F16L 9/006* (2013.01)

(58) Field of Classification Search
CPC .......... B05B 9/01; B05B 1/34; B05B 1/3405; B05B 1/341; B05B 1/3415; F16L 9/006
USPC ....... 239/487, 489, 463, 525, 526, 530, 532, 239/589, 590, 590.5; 138/122
See application file for complete search history.

(56) References Cited

U.S. PATENT DOCUMENTS

| | | | | |
|---|---|---|---|---|
| 425,165 | A * | 4/1890 | Doty | B05B 1/28 239/489 |
| 550,336 | A * | 11/1895 | Williams | B05B 1/341 239/489 |
| 2,613,993 | A * | 10/1952 | Holden | B05B 3/00 138/122 |
| 3,116,019 | A * | 12/1963 | Graef | B05B 1/341 239/525 |
| 5,669,558 | A * | 9/1997 | Ichel | B05B 1/34 239/532 |
| 8,544,765 | B1 * | 10/2013 | Cornell | B05B 1/3402 239/11 |

* cited by examiner

*Primary Examiner* — Steven J Ganey

(57) ABSTRACT

A guiding pipe for a water sprayer, and the water sprayer has a handle with an intake end configured to connect to a water source and another end connected a spray head through a guiding pipe. The guiding pipe has a spiral main tube provided with a respective circular connecting section at each end, and the circular connecting sections are respectively connected to the handle and the spray head.

10 Claims, 6 Drawing Sheets

GUIDING PIPE FOR WATER SPRAYER

BACKGROUND of INVENTION

Field of Invention

The present invention relates to a water sprayer, and more particularly to a guiding pipe for a water sprayer.

Description of the Related Art

Currently, as shown in FIG. 6, the water sprayer 20 mainly has a handle 21 that can be held. An end of the handle 21 is the intake end, and the intake end is connected to the water source; the other end of the handle 21 is connected with a spray head 23 through the extension of a guiding pipe 22, and the guiding pipe 22 is used to transfer the water source into the water sprayer 20 to the direction of the spray head 23. Therefore, the water supply can be sprayed from the spray head 23 for garden watering or washing purposes.

However, the above-mentioned conventional structure still has the following problem in practical applications: the guiding pipe 22 is a simple round tube, so it is impossible to speed up the water supply in the pipe before spouting it.

Therefore, it is desirable to provide a guiding pipe for a water sprayer to mitigate and/or obviate the aforementioned problems.

SUMMARY OF THE INVENTION

An objective of present invention is to provide a guiding pipe for a water sprayer, which is capable of improving the above-mention problems.

In order to achieve the above mentioned objective, a guiding pipe for a water sprayer, and the water sprayer has a handle with an intake end configured to connect to a water source and another end connected a spray head through a guiding pipe. The guiding pipe has a spiral main tube provided with a respective circular connecting section at each end, and the circular connecting sections are respectively connected to the handle and the spray head.

Other objects, advantages, and novel features of invention will become more apparent from the following detailed description when taken in conjunction with the accompanying drawings.

DETAILED DESCRIPTION OF THE PREFERRED EMBODIMENT

Figure 1:
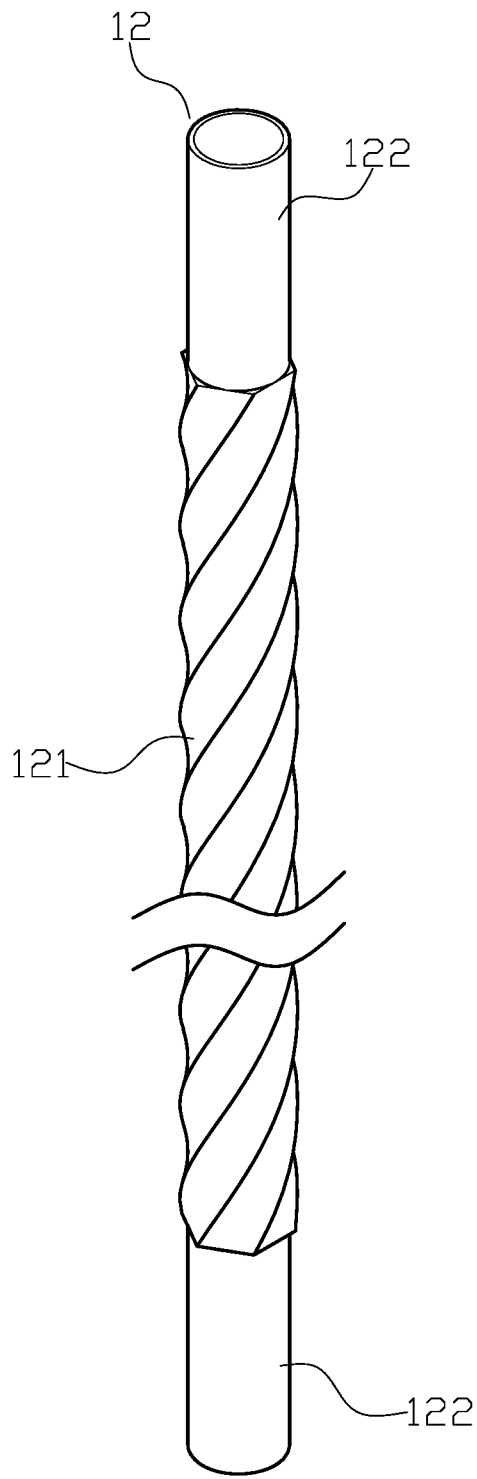
FIG. 1 is a perspective view of the guiding pipe according to a preferred embodiment of the present invention.
Figure 2:
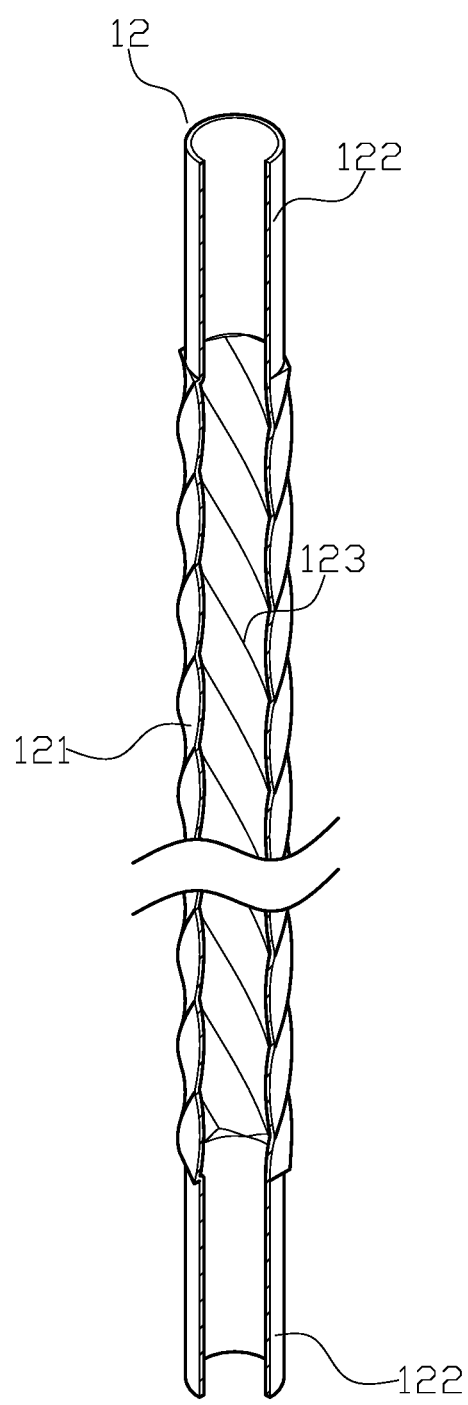
FIG. 2 is a three-dimensional cross-sectional view of the guiding pipe according to the preferred embodiment of the present invention.
Figure 3:
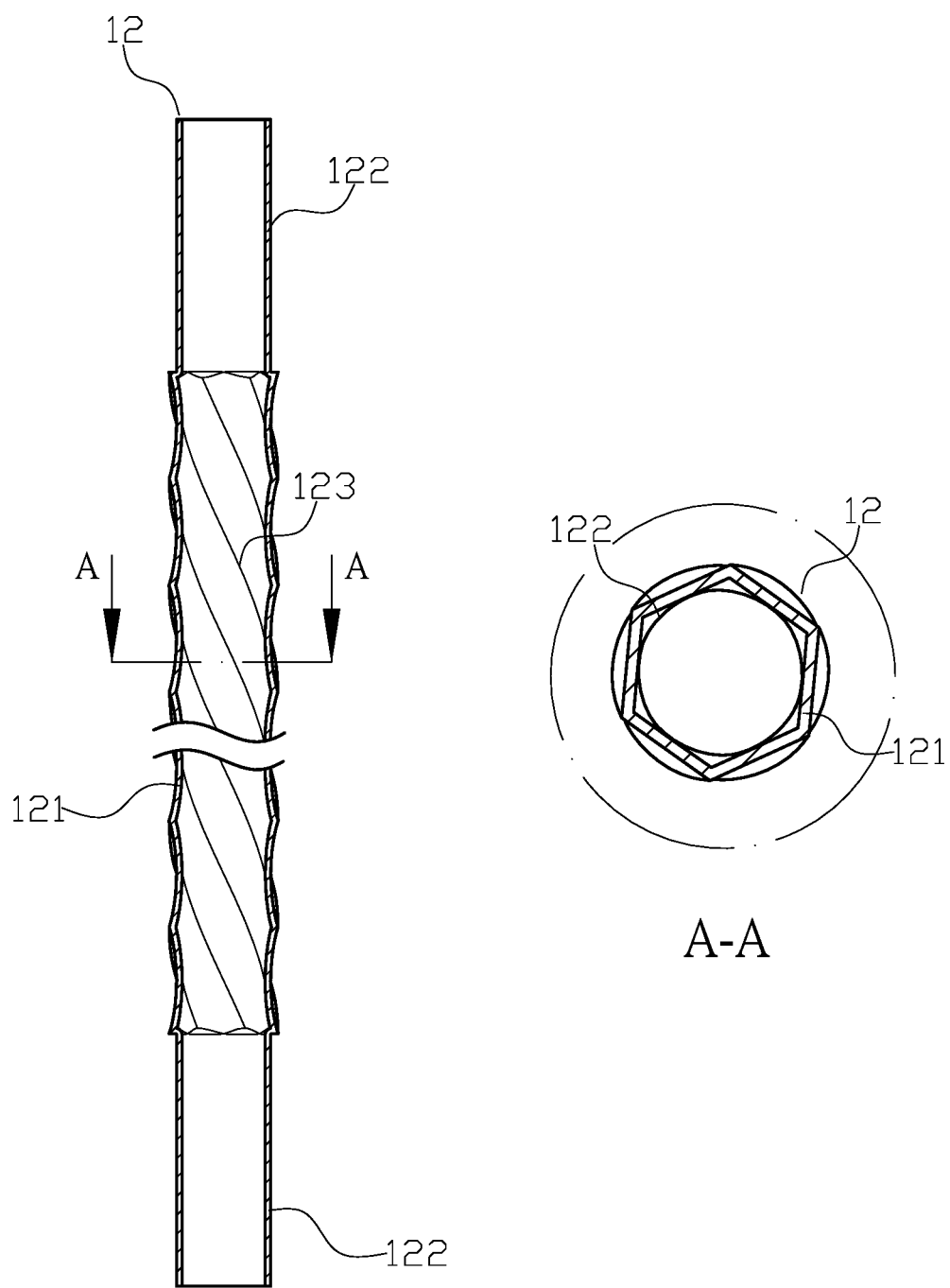
FIG. 3 is another cross-sectional view of the guiding pipe according to the preferred embodiment of the present invention.
Figure 4:
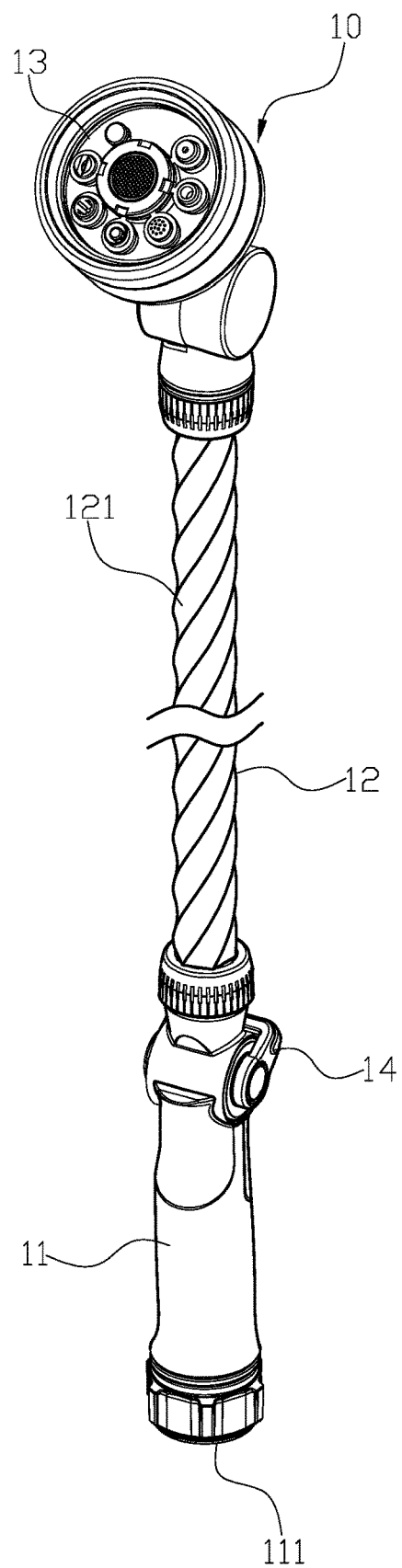
FIG. 4 shows the implementation state of the guiding pipe and, the handle and the spray head composing into a water sprayer.

First, please refer to FIG. 1 to FIG. 4. The water sprayer 10 has a handle 11 with an intake end 111 configured to connect to a water source and another end connected a spray head 13 through a guiding pipe 12, so the guiding pipe 12 delivers water from the water sprayer 10 to the spray head 13. Furthermore, the guiding pipe 12 has a spiral main tube 121 provided with a respective circular connecting section 122 at each end, and the circular connecting sections 122 are respectively connected to the handle 11 and the spray head 13. Therefore, the handle 11, the guiding pipe 12 and the spray head 13 have tight sealed connections without leakage. The spiral pattern 123 formed on the inner tube wall of the guiding pipe 12 is designed to guide the water supply to rotate rapidly in the inner tube portion before spraying out. With the design, the flow and spray of the water supply is much smoother, the power of the water spray can also be significantly improved, so that the water sprayer 10 can provide a strong water flow without additional pressure.

Moreover, the water sprayer 10 is a finger trigger sprayer, and the handle 11 further has a trigger 14.

In addition, an outer diameter of the main tube 121 of the guiding pipe 12 is greater than the circular connecting sections 122.

Furthermore, the spiral main tube 121 is a twisted polygonal tube.

Moreover, the polygonal tube has a hexagonal cross-section

Also, the spiral main tube 121 is made by forming a plurality of indentations on an outer periphery of the guiding pipe 12 and then twisting the guiding pipe 12.

Figure 5:
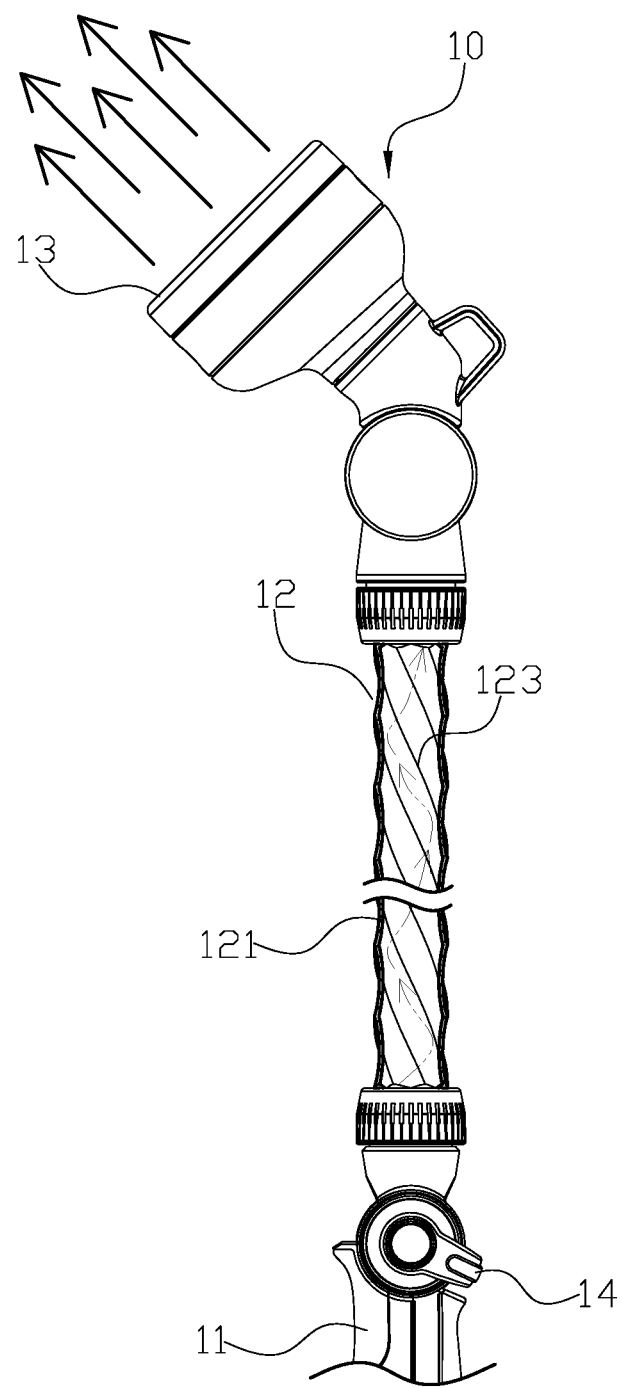
FIG. 5 shows the water flow in the preferred embodiment of the present invention.
Figure 6:
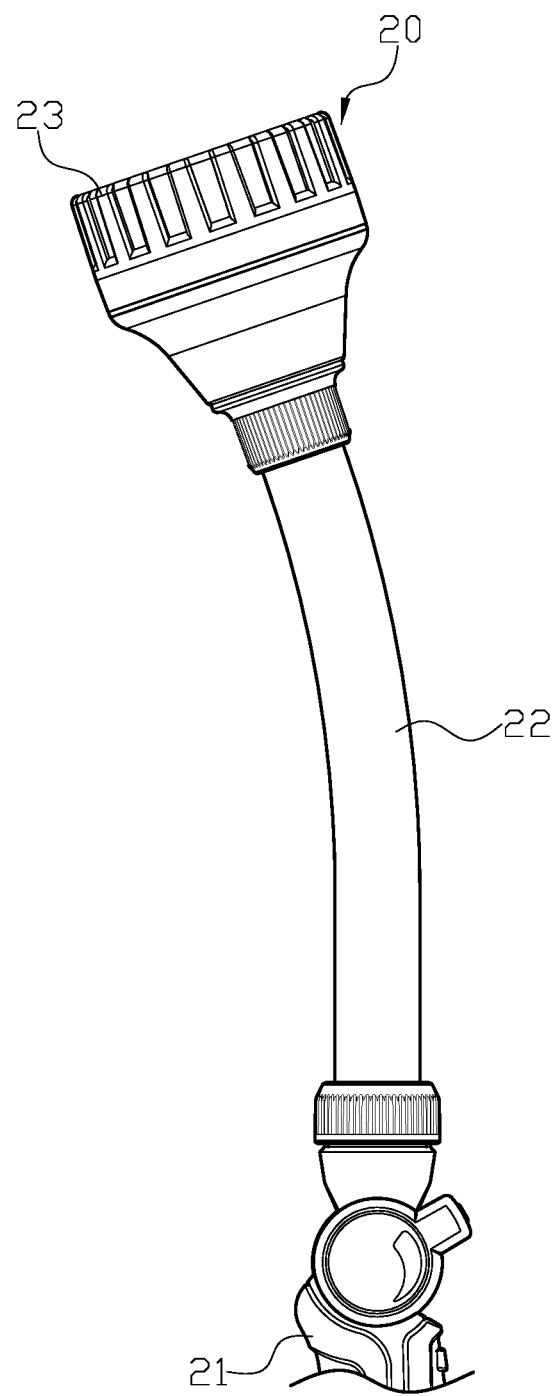
FIG. 6 is drawing of a conventional structure.

In actual use, the spiral pattern 123 formed on the inner tube wall of the main tube 121 is designed to guide the water supply to rotate rapidly in the inner tube portion before spraying out. Please also refer to FIG. 5, with the design, the flow and spray of the water supply is much smoother, the power of the water spray can also be significantly improved, so that the water sprayer 10 can provide a strong water flow without additional pressure.

Although the present invention has been explained in relation to its preferred embodiment, it is to be understood that many other possible modifications and variations can be made without departing from the spirit and scope of invention as hereinafter claimed.

What is claimed is:

1. A guiding pipe for a water sprayer, the water sprayer having a handle with an intake end configured to connect to a water source and another end connected a spray head through the guiding pipe, wherein:
   the guiding pipe comprises a spiral main tube defining a spiral pattern on an inner wall of the guiding pipe, the guiding pipe further comprising a respective circular connecting section at each end, and the circular connecting sections are respectively connected to the handle and the spray head;
   wherein the spiral main tube is a twisted polygonal tube.

2. The guiding pipe for a water sprayer as claimed in claim 1, wherein the water sprayer is a finger trigger sprayer, and the handle further has a trigger.

3. The guiding pipe for a water sprayer as claimed in claim 1, wherein an outer diameter of the main tube of the guiding pipe is greater than the circular connecting sections.

4. The guiding pipe for a water sprayer as claimed in claim 1, wherein the polygonal tube has a hexagonal cross-section.

5. The guiding pipe for a water sprayer as claimed in claim 1, wherein the spiral main tube is made by forming a plurality of indentations on an outer periphery of the guiding pipe and then twisting the guiding pipe.

6. A guiding pipe for a water sprayer, the water sprayer having a handle with an intake end configured to connect to a water source and another end connected a spray head through the guiding pipe, wherein:

the guiding pipe comprises a spiral main tube defining a spiral pattern on an inner wall of the guiding pipe, the guiding pipe further comprising a respective circular connecting section at each end, and the circular connecting sections are respectively connected to the handle and the spray head;

the spiral main tube is made by forming a plurality of indentations on an outer periphery of the guiding pipe and then twisting the guiding pipe.

7. The guiding pipe for a water sprayer as claimed in claim 6, wherein the spiral main tube is a twisted polygonal tube.

8. The guiding pipe for a water sprayer as claimed in claim 7, wherein the polygonal tube has a hexagonal cross-section.

9. The guiding pipe for a water sprayer as claimed in claim 6, wherein the water sprayer is a finger trigger sprayer, and the handle further has a trigger.

10. The guiding pipe for a water sprayer as claimed in claim 6, wherein an outer diameter of the main tube of the guiding pipe is greater than the circular connecting sections.

* * * * *